United States Patent [19]
Hashimoto et al.

[11] Patent Number: 4,875,455
[45] Date of Patent: Oct. 24, 1989

[54] AUTOMOBILE EXHAUST GAS RECIRCULATING SYSTEM

[75] Inventors: Noboru Hashimoto; Mitsuo Hitomi; Koji Onishi; Yoshikuni Yada, all of Hiroshima; Hidetoshi Nobumoto, Higashihiroshima; Makoto Hotate, Kure, all of Japan

[73] Assignee: Mazda Motor Corporation, Hiroshima, Japan

[21] Appl. No.: 180,781

[22] Filed: Apr. 12, 1988

[30] Foreign Application Priority Data

Apr. 28, 1987 [JP] Japan ................... 62-107112
Jul. 27, 1987 [JP] Japan ................... 62-185492

[51] Int. Cl.$^4$ ................. F02M 25/06; F01L 1/26; F02B 75/40
[52] U.S. Cl. ........................... 123/568; 123/315; 60/324
[58] Field of Search ............. 123/315, 568, 569, 571, 123/323; 60/324

[56] References Cited

U.S. PATENT DOCUMENTS

| | | | |
|---|---|---|---|
| 3,166,057 | 1/1965 | Konrad et al. | 123/568 X |
| 3,941,113 | 3/1976 | Baguelin | 123/568 X |
| 4,426,986 | 1/1984 | Müller et al. | 123/571 |
| 4,651,684 | 3/1987 | Masuda et al. | 123/315 X |
| 4,690,110 | 9/1987 | Nishimura et al. | 123/90.17 |

FOREIGN PATENT DOCUMENTS

| | | | |
|---|---|---|---|
| 0180906 | 6/1980 | Japan . | |
| 0112814 | 9/1980 | Japan . | |
| 0163121 | 10/1982 | Japan | 123/315 |
| 0128920 | 7/1984 | Japan | 123/315 |
| 2063362 | 6/1981 | United Kingdom | 123/315 |

Primary Examiner—Willis R. Wolfe
Attorney, Agent, or Firm—Wenderoth, Lind & Ponack

[57] ABSTRACT

An exhaust gas recirculating system for a combustion engine has at least one cylinder communicating with a source of combustible air-fuel mixture through at least one intake port adapted to be selectively closed and opened for effecting the interruption and admission of the supply of the combustible mixture into the combustion chamber, the cylinder also communicating with an exhaust system through first and second exhaust ports both adapted to be selectively opened and closed. The exhaust gas recirculating system includes an intake valve for selectively opening and closing the intake port, first and second exhaust valves each for selectively closing and opening the associated first and second exhaust ports, wherein the first exhaust valve is operable to completely close the associated first exhaust port subsequent to the complete closure of the second exhaust port by the associated second exhaust valve, an exhaust shutter valve for selectively opening and closing a passage extending between the first exhaust port and the exhaust system, and a control unit for controlling the shutter valve according to an engine operating condition to adjust the amount of a portion of the exhaust gases allowed to substantially remain within the cylinder.

11 Claims, 4 Drawing Sheets

AUTOMOBILE EXHAUST GAS RECIRCULATING SYSTEM

BACKGROUND OF THE INVENTION

1. Field of the Invention

The present invention relates to an automobile exhaust gas recirculating system for feeding a portion of automobile exhaust gases back into a combustion chamber for reuse in combustion with a fresh combustible air-fuel mixture.

2. Description of the Prior Art

The automobile exhaust gas recirculating (EGR) system employed in commercially available automobiles and designed, although not exclusively, to minimize the NOx emission is available in two types: an external EGR system in which an automobile exhaust system is connected with an automobile fuel intake system for feeding a controlled amount of the exhaust gases discharged from the combustion chamber back to the combustion chamber through the fuel intake system, and an internal EGR system in which a controlled amount of the exhaust gases being charged to the exhaust system is allowed to substantially remain within the combustion chamber or to back-flow into a portion of the intake system adjacent the combustion chamber.

As compared with the external EGR system, the internal EGR system has an advantage in that, since that portion of the exhaust gases, the product of combustion of a combustible air-fuel mixture which has taken place in the combustion chamber, is allowed to substantially remain within the combustion chamber or to back-flow into a portion of the intake system adjacent the combustion chamber, the temperature of that portion of the exhaust gases is still so high as to act as a "heater" for heating a fresh combustible mixture supplied into the combustion chamber during the suction stroke of the next succeeding cycle of operation of the engine, thereby facilitating atomization of the fresh combustible mixture. Therefore, for a given amount of the exhaust gases utilized in the same combustion chamber in which such exhaust gases have been produced, the combustibility can be stabilized more effectively by the internal EGR system than by the external EGR system.

One way to accomplish the internal exhaust gas recirculation which is well known in the art is to provide an intake-exhaust overlap period, that is, a period during which an intake valve for selectively opening and closing an intake port and an exhaust valve operable in a manner opposite to the manner in which the intake valve operates for selectively closing and opening an exhaust port are simultaneously opened. During the intake-exhaust overlap period, that is, the simulataneous opening of the intake and exhaust valve, the exhaust gases being discharged to the exhaust system as a result of a progressive opening of the exhaust valve are partially drawn into the combustion chamber by the effect of the negative pressure which has been developed inside the intake system during the opening of the intake valve. Depending on the length of the intake-exhaust overlap period and/or the magnitude of the negative pressure developed inside the intake system, a portion of the exhaust gases may back-flow into the intake system, particularly into a portion of the intake system adjacent the combustion chamber. That portion of the exhaust gases substantially remaining within the combustion chamber is mixed with the subsequently supplied combustible mixture for the purpose discussed above.

An example of the prior art internal EGR system is disclosed in, for example, the Japanese Laid-open Patent Publication No. 55-112814, published in 1980; and the Japanese Laid-open Utility Model Publication No. 55-180906, published in 1980.

Apart from the disclosure made in any one of the above-mentioned prior art publications, where both the valve timing relationship between the intake and exhaust valves and the intake-exhaust overlap period are fixed, a problem has arisen in that, since the amount of that portion of the exhaust gases drawn into the combustion chamber depends on the negative pressure developed in the intake system, not only can that portion of the exhaust gases not be controlled to a value appropriate for a particular engine operating condition, but also a loss of temperature of that portion of the exhaust gases tends to occur because that portion of the exhaust gases has been discharged to the exhaust passage and the temperature thereof has been consequently lowered due to the contact thereof with the wall defining the exhaust passage.

In an attempt to substantially eliminate the problems inherent in the system wherein the intake-exhaust overlap period is fixed, both Japanese Laid-open Patent Publication No. 55-112814 and Japanese Laid-open Utility Model Publication No. 55-180906 disclose systems in which the valve timing mechanism is designed to vary the intake-exhaust overlap period. Although the use of a variable intake-exhaust overlap period is advantageous in that pumping loss can be minimized, the valve timing mechanism tends to have a relatively complicated structure and, therefore, is expensive to manufacture.

SUMMARY OF THE INVENTION

The present invention has therefore been developed to substantially eliminate the above-discussed problems inherent in the prior art EGR system and has as its essential object to provide an improved EGR system, particularly an improved internal EGR system, in which the amount of exhaust gases allowed to remain within the combustion chamber is optimum for a particular engine operating condition.

To this end, there is disclosed an internal combustion engine having at least one combustion chamber. The combustion chamber has a piston accommodated therein for undergoing up and down movement within the combustion chamber, the movement of the piston being transmitted to a crankshaft through a connecting rod. This combustion chamber communicates with a source of combustible air-fuel mixture through at least one intake port adapted to be selectively closed and opened by a corresponding intake valve for effecting the interruption and admission of the supply of the combustible mixture into the combustion chamber, respectively. The combustion chamber also communicates with an exhaust system through a pair of exhaust ports both adapted to be selectively opened and closed by respective exhaust valves operated in a manner generally opposite to the manner in which the intake valve is operated so that, during the closure of the intake valve and the opening of the exhaust valves, the exhaust gases produced within the combustion chamber as a result of combustion of the combustible mixture can be discharged through the exhaust ports to the outside by way of the exhaust system.

In the engine having the above-described structure, a valve timing mechanism comprising an intake cam means and an exhaust cam means is employed for driving the intake valve and the exhaust valves in a well known timed relationship with the rotation of the crankshaft and in a manner generally opposite to each other. However, in one preferred embodiment of the present invention, the valve timing mechanism is so designed that, while one of the exhaust valves is opened substantially simultaneously with the opening of the other of the exhaust valves, such one of the exhaust valves is completely closed subsequent to the complete closure of such other of the exhaust valves . In other words, the timing at which one of the exhaust valves is completely closed is delayed relative to that at which the other of the exhaust valves is completely closed so that the intake-exhaust overlap period, during which the intake port and one of the exhaust ports which is associated with such one of the exhaust valves are simultaneously open, is different from, i.e., longer than, the intake-exhaust overlap period during which the same intake port and the other of the exhaust ports are simultaneously open.

In another preferred embodiment of the present invention, the timing valve mechanism is provided with a mode changer operable in one of synchronized and delayed modes for controlling the timing of complete closure of one of the exhaust valves relative to the timing of complete closure of the other of the exhaust valves. More specifically, when the mode changer is in the synchronized mode, one of the exhaust valves is opened and closed substantially simultaneously with the opening and closure of the other of the exhaust valves, respectively. When the mode changer is in the delayed mode, however, while such one of the exhaust valves is opened substantially simultaneously with the opening of the other of the exhaust valves, such one of the exhaust valves is completely closed subsequent to the complete closure of such other of the exhaust valves so that the intake-exhaust overlap period, during which the intake port and one of the exhaust ports which is associated with such one of the exhaust valves are simultaneously open, is different from, i.e., longer than, the intake-exhaust overlap period during which the same intake port and the other of the exhaust ports are simultaneously open.

Also, in accordance with the present invention, there is provided a shutter means for selectively opening and closing a passage extending between one of the exhaust ports, and a control means for controlling the exhaust shutter means according to an engine operating condition to adjust the amount of that portion of the exhaust gases allowed to substantially remain within the combustion chamber.

Preferably, the control of the shutter means by the control means is carried out when the engine is operated under a low speed, low load operating condition. In particular, the exhaust shutter means may be held in position to completely close the passage when the engine is operated under one of a low speed, high load operating condition and an idling condition.

BRIEF DESCRIPTION OF THE DRAWINGS

These and other objects and features of the present invention will become clear from the following description of preferred embodiments thereof with reference to the accompanying drawings in which like parts are designated by like reference numerals and in which.

DETAILED DESCRIPTION OF THE PREFERRED EMBODIMENTS

Figure 1:
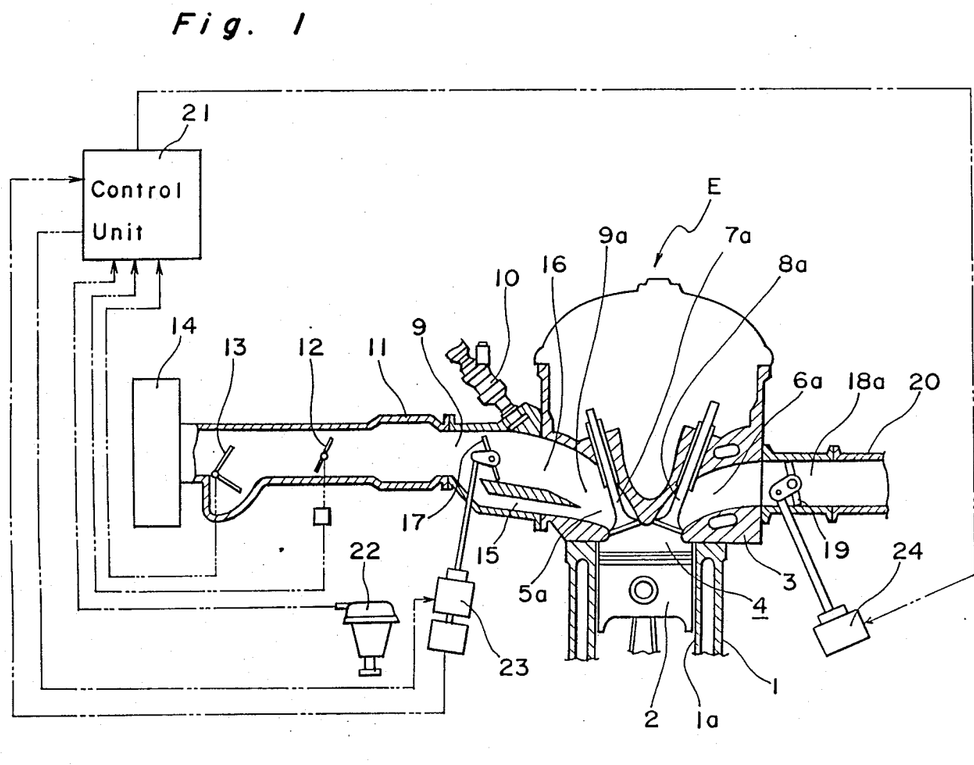
FIG. 1 is a fragmentary longitudinal sectional view of an automobile internal combustion engine having an internal EGR system according to one preferred embodiment of the present invention.
Figure 2:
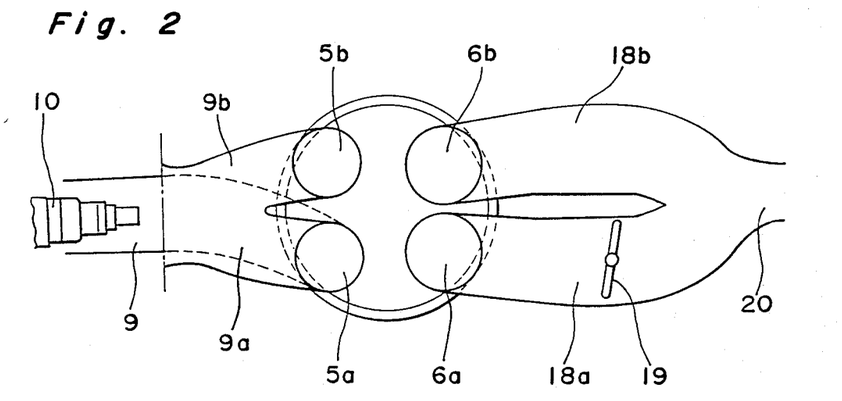
FIG. 2 is a schematic diagram showing the layout of intake and exhaust ports in relation to the intake and exhaust systems, respectively, of the automobile engine shown in FIG. 1.

Referring first to FIGS. 1 and 2, there is shown an automobile power plant including an internal combustion engine E. The engine E comprises a cylinder block 1 having at least one cylinder bore 1a defined therein and accommodating therein a piston 2 for undergoing up and down movement, the movement of the piston being transmitted to a crankshaft through a connecting rod. The engine E also comprises a cylinder head 3 rigidly mounted on the cylinder block 1 with a combustion chamber 4 defined by the cylinder block 1, the piston 2 and the cylinder head 3.

This combustion chamber 4 communicates with a source of a combustible air-fuel mixture through first and second intake ports 5a and 5b defined in the cylinder head 3 and adapted to be selectively closed and opened by respective first and second intake valves 7a and 7b for effecting the interruption and admission of the supply of the combustible mixture into the combustion chamber 4. The combustion chamber 4 also communicates with an exhaust system through first and second exhaust ports 6a and 6b defined in the cylinder head 3 and adapted to be selectively opened and closed by respective first and second exhaust valves 8a and 8b operated in a manner generally opposite to the manner in which intake valves 7a and 7b are operated so that, during the closure of the intake valves 7a and 7b and the opening of the exhaust valves 8a and 8b, the exhaust gases produced within the combustion chamber 4 as a result of combustion of the combustible mixture can be discharged through the exhaust ports 6a and 6b to the outside by way of the exhaust system.

The source of combustible mixture shown therein comprises a fuel intake system including first and second intake manifold ducts 9a and 9b communicating at one end with the respective first and second intake ports 5a and 5b and at the other end with a common intake duct 9 extending outwardly from the first and second intake manifold ducts 9a and 9b to an air cleaner 14 open to the atmosphere. The fuel intake system also includes a fuel injector 10 disposed in the common intake duct 8 adjacent the joint between the common intake duct 9 and the first and second intake manifold ducts 9a and 9b for injecting fuel into the combustion chamber 4 through the intake manifold ducts 9a and 9b, the fuel being subsequently mixed with air to provide the combustible mixture. The common intake duct 9 has an air flow meter 13 disposed therein adjacent the air cleaner 14 for measuring, and generating an air flow signal indicative of, the flow of air therethrough, throttle valve 12 linked with an accelerator pedal (not shown) accessible to an automobile driver and disposed inside the common intake duct 9 for regulating the flow of air therethrough towards the combustion chamber 4, and a surge tank 11 having a predetermined volume disposed between the injector 18 and the throttle valve 12 for reducing the pulsating flow of air towards the combustion chamber 4.

One of the intake manifold ducts of the fuel intake system, that is, the first intake manifold duct 9a is, as best shown in FIG. 1, partitioned to provide primary and secondary manifold passage 15 and 16, the primary manifold passage 15 having a cross-sectional area that is smaller than that of the secondary manifold passage 16 over substantially the entire lengths thereof. The secondary manifold passage 16 has a suction control valve 17 disposed therein adjacent an inlet end thereof for regulating the flow of the air therethrough.

The exhaust system includes first and second exhaust manifold ducts 18a and 18b communicating at first ends thereof with the respective first and second exhaust ports 6a and 6b and at the other ends thereof with a common exhaust duct 20. One of the exhaust manifold ducts, that is, the first exhaust manifold duct 18a communicating with the exhaust port 6a, has an exhaust shutter valve 19 disposed therein for regulating the flow of that portion of the exhaust gases which is discharged from the combustion chamber 4 into the first exhaust manifold duct 18a. The exhaust shutter valve 19 is adapted to be controlled by an actuator 24 as will be described later.

Figure 4:
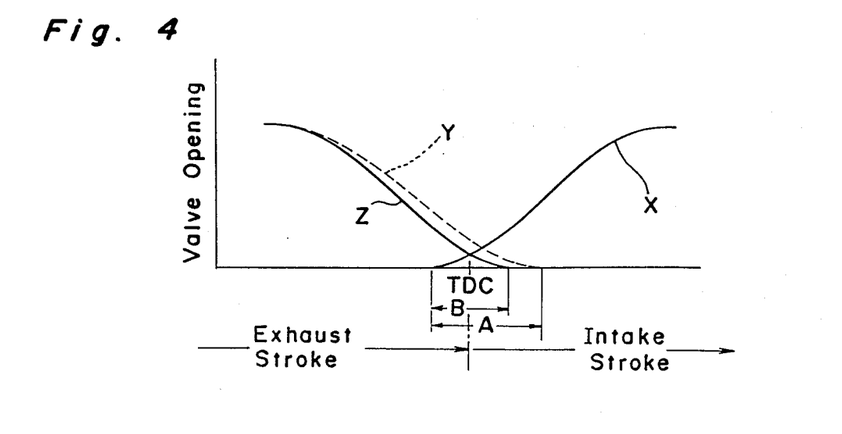
FIG. 4 is a graph showing the relationship between the timing at which exhaust ports are closed and the timing at which intake ports are opened.

In the embodiment so far described, the first and second intake valves 7a and 7b are simultaneously operated so as to selectively open and close the first and second intake ports 5a and 5b, respectively, substantially as shown by a common curve X in the graph of FIG. 4 wherein TDC stands for the top dead center position of the piston 2. On the other hand, although the first and second exhaust valves 8a and 8b open the associated first and second exhaust ports 6a and 6b simultaneously a predetermined time after the start of the intake stroke, that is, after the opening of the first and second intake valves 7a and 7b, the complete closure of the first exhaust valve 8a takes place subsequent to the complete closure of the second exhaust valve 8b. In other words, the timing at which the first exhaust valve 8a is completely closed as shown by a curve Y in FIG. 4 is delayed relative to that at which the second exhaust valve 8b is completely closed, as shown by a curve Z in FIG. 4, so that the intake-exhaust overlap period A shown in FIG. 4, during which the first exhaust port 6a, associated with the first exhaust valve 8a, and any one of the first and second intake ports 5a and 5b are simultaneously open, is longer than the intake-exhaust overlap period B, shown in FIG. 4, during which the second exhaust port 6b and any one of the first and second intake ports 5a and 5b are simultaneously open.

A valve timing mechanism necessary to cause the first and second intake valves 7a and 7b and the first and second exhaust valves 8a and 8b to operate in the above-described manner, that is, to cause the first and second intake valves 7a and 7b to operate in a manner represented by the curve X and the exhaust valves 8a and 8b to operate in a manner represented by the respective curves Y and Z, may be any of a known type such as that disclosed in, for example, any one of the previously mentioned prior art publications and, therefore, the details thereof will not be reiterated for the sake of brevity. For example, cams mounted on a well-known camshaft for driving the exhaust valves, respectively, having different profiles may be used to open one of the exhaust valves for a longer period of time than the other of the exhaust valves is opened.

From the foregoing description, it will readily be seen that the exhaust shutter valve 19 is disposed in the first exhaust manifold duct 18a communicating with that first exhaust port 6a which is opened subsequent to the opening of the second exhaust port 6b. The reason for this is because, since the intake-exhaust overlap period A is longer than the intake-exhaust overlap period B as described above, a relatively large amount of the exhaust gases required for effecting the internal exhaust gas recirculation can be obtained in the first exhaust manifold duct 18a and the amount of the exhaust gases actually caused to back-flow into, or remain in, the combustion chamber 4 can therefore be readily adjusted depending on the position of the exhaust shutter valve 19.

The exhaust shutter valve 19 is operatively coupled with the actuator 24 which controls the exhaust shutter valve 19 in dependence on an engine operating condition. For this purpose, a control unit 21 is provided, which control unit 21 is adapted to receive a throttle signal indicative of the opening of the throttle valve 12 which varies with a load imposed on the engine E, an air flow signal generated from the air flow meter 13, a cranking signal indicative of the crank angle detected by a cranking angle sensor 22, and a valve signal indicative of the opening of the control valve 17 used to control the force of an eddy current induced by the flow of air through the primary manifold passage 15. The control unit 21 is programmed to process these input signals to determine the operating condition of the engine then prevailing and then to generate commands, one to the actuator 24 for controlling the exhaust shutter valve 19 and the other to an actuator 23 for controlling the control valve 17, in the following manner.

Figure 3:
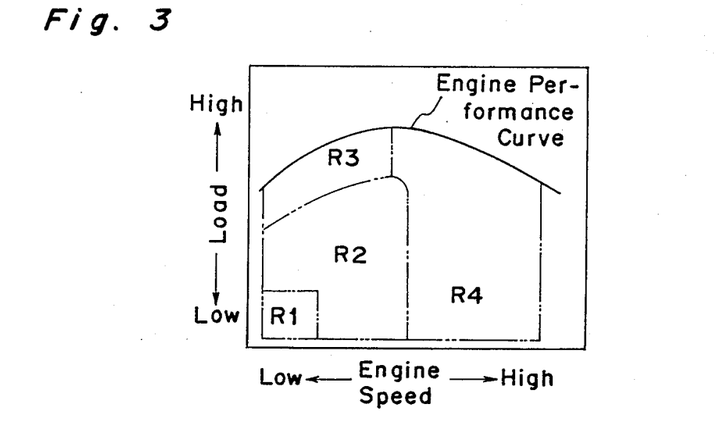
FIG. 3 is a graph showing the relationship between an engine operating condition and the timing at which a shutter valve is controlled in the internal EGR system.

The opening of the exhaust shutter valve 19 varies depending on the engine operating condition in the following manner. Referring now to FIG. 3, when and so long as the engine E is operating under a low speed, low load operating condition represented by a region R1 such as during the idling of the engine E, a stabilized combination of the combustible mixture is particularly required in the combustion chamber 4 and, therefore, the exhaust shutter valve 19 is closed to minimize the amount of the exhaust gases back-flowing into the combustion chamber 4 and, hence, to substantially avoid any possible dilution of the subsequently supplied combustible mixture which would occur if the exhaust gases were recirculated to mix with such subsequently supplied combustible mixture. The closure of the exhaust shutter valve 19 takes place even when the engine is operating under a low speed, high load operating condition represented by a region R3 during which engine knocking is apt to occur, so as to avoid the possibility that the temperature of the exhaust gases recirculated into the combustion chamber 4 may trigger the engine knocking.

On the other hand, during a high speed engine operating condition represented by a region R4 in which a high speed and a high engine power output are simultaneously required, the exhaust shutter valve 19 is held in a full open position so that the exhaust gases produced in the combustion chamber 4 can be exhausted substantially equally through the exhaust manifold ducts 18a and 18b. In particular, during this high speed engine operating condition, the exhaust efficiency can be increased to provide a high engine power output in view of the fact that not only is a relatively quick discharge of the exhaust gases effected through the first and second exhaust manifold ducts 18a and 18b, but also the intake-exhaust overlap period A is prolonged to give the exhaust gases extra time to exhaust from the combustion chamber 4.

In an intermediate region R2 in which the engine E is operating at medium speed with medium load, the exhaust shutter valve 19 is controlled to open a predetermined amount corresponding to a desired ratio of the amount of the exhaust gases recirculated into the combustion chamber 4 relative to the amount of the subsequently supplied combustible mixture in the same combustion chamber 4. By so doing, not only can the fuel consumption be substantially reduced, but the combustibility can also be stabilized.

Thus, it has now become clear that, according to the present invention, the exhaust shutter valve 19 is closed to interrupt the flow of the exhaust gases through the first and second exhaust manifold duct 18a and 18b during one of the idling and the low speed, high load engine operating conditions so that the amount of the exhaust gases allowed to substantially remain within the combustion chamber 4 can be minimized to ensure the stabilized combustion of the combustible mixture for the purpose of minimizing the occurrence of engine knocking. During the high speed, high load engine operating condition, the exhaust shutter valve 19 is fully opened to permit the discharge of the exhaust gases through both of the first and second exhaust manifold ducts 18a and 18b so that a relatively large amount of the high-temperature exhaust gases can be recirculated into the combustion chamber to minimize the pumping loss and also to substantially reduce the fuel consumption of the engine. Also, during the medium speed, medium load engine operating condition, the exhaust shutter valve 19 is so controlled that a predetermined ratio of the exhaust gases, substantially remaining in the combustion chamber 4 and subsequently mixed with the combustion mixture, relative to the amount of the combustion mixture charged into the same combustion chamber 4 can be obtained.

In describing the foregoing embodiment of the present invention, reference has been made to the use of the exhaust shutter valve for adjusting the cross-sectional area of the exhaust manifold duct associated with one of the exhaust valves, the opening of which is longer than the other of the exhaust valves. Instead of the exhaust shutter valve, however, a mechanism may be used which stops at a position in which the exhaust manifold duct is closed and which is capable of selectively opening and closing the exhaust manifold duct to switch over the intake-exhaust overlap period to control the amount of the exhaust gases substantially remaining in the combustion chamber.

Figure 5:
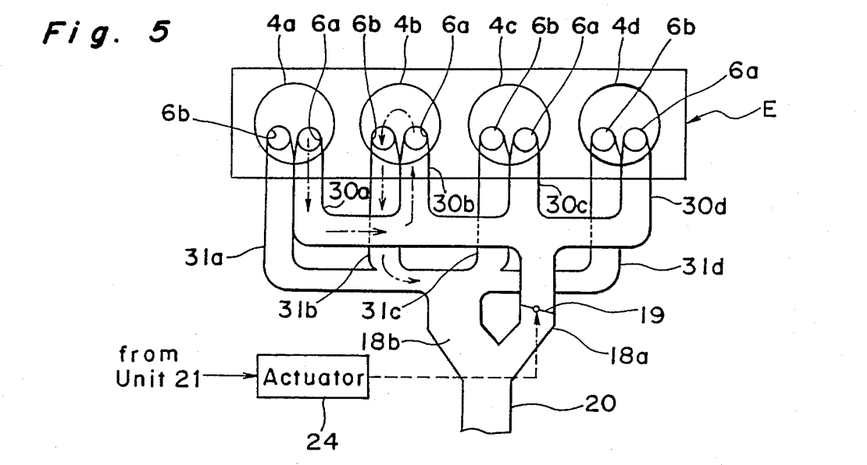
FIG. 5 is a schematic diagram showing the internal EGR system employed in a multicylinder automobile engine according to another preferred embodiment of the present invention.

FIGS. 5 to 8 illustrate the application of the present invention to a multicylinder internal combustion engine. As best shown in FIG. 5, the engine E is shown as having four combustion cylinders (or cylinders) 4a, 4b, 4c and 4d arranged in line with each other. The first exhaust manifold duct 18a in which the exhaust shutter valve 19 is disposed in fluid-connected with the first exhaust ports 6a of all of the combustion chambers 4a to 4d through a corresponding number of exhaust branch passages 30a, 30b, 30c and 30d and, similarly, the second exhaust manifold duct 18b is fluid-connected with the second exhaust ports 6b of all of the combustion chambers 4a to 4d through a corresponding number of exhaust branch passages 31a, 31b, 31c and 31d.

Figure 8:
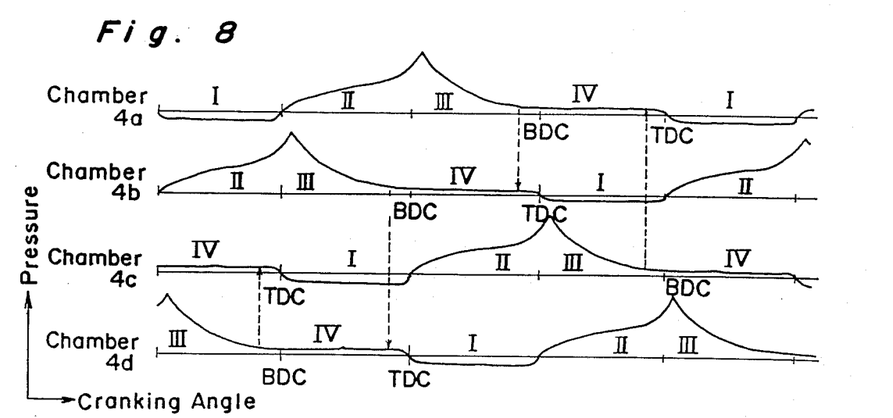
FIG. 8 is a timing chart showing the change is pressure inside combustion chambers in the multicylinder engine according to the four strokes of the engine operating cycle.

As best shown in FIG. 8 which illustrates the change in pressure inside each of the combustion chambers 4a to 4d during each cycle of intake, compression, power and exhaust strokes, the multicylinder engine shown in FIG. 5 is assumed to fire in the sequence of the combustion chamber 4a followed by the combustion chamber 4c followed by the combustion chamber 4b followed by the combustion chamber 4d. Thus, it will be readily seen that when the combustion chamber 4a is on the intake stroke I, the next succeeding combustion chambers 4b to 4d are on the compression, exhaust and power (ignition) strokes II, IV and III, respectively.

Accordingly, assuming that the exhaust gases produced in the combustion chamber 4a start to blow down at about the end of the power stroke, that is, the first and second exhaust ports 6a and 6b of the combustion chamber 4a start to open shortly before the piston in the combustion chamber 4a reaches the bottom dead center position, the exhaust gases produced in the combustion chamber 4a are in part discharged to the common exhaust duct 20 through the associated exhaust manifold duct 31a and are in part forced to flow into one of the other combustion chambers whose firing sequence is delayed one stroke relative to the stroke occurring in the combustion chamber 4a, that is, the next adjacent combustion chamber 4b which is then at about the end of the exhaust stroke as shown by the arrow-headed chain line in FIG. 5. Considering that the exhaust gases contain a relatively large amount of unburned hydrocarbon, the supply of a portion of the exhaust gases from one combustion chamber to the next succeeding combustion chamber such as described above permits the unburned component contained in that portion of the exhaust gases to be reburned thereby minimizing the amount of the unburned component of the exhaust gases as a whole. This is because that portion of the exhaust gases travels a substantial length of time through the exhaust branch passages 30a and 30b, during which oxidization of that portion of the exhaust gases takes place, thereby minimizing the amount of the unburned component which has been contained in that portion of the exhaust gases.

Figure 6:
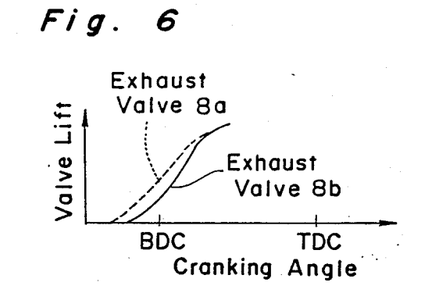
FIG. 6 is a graph showing the relationship between the respective timing at which the exhaust ports are opened and the position of the piston in each of the combustion chambers in the multicylinder engine.
Figure 7:
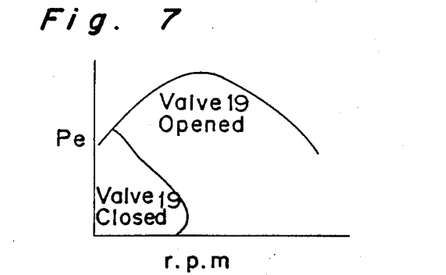
FIG. 7 is a graph showing the timing at which the shutter valve is controlled according to an engine operating condition.

The amount of the exhaust gases discharged through the second exhaust port 6b of each of the combustion chambers 4a to 4d is preferred to be relatively small and, for this purpose, the second exhaust valve 8b in the instance now under discussion with reference to FIGS. 5 to 9 for each of the combustion chambers 4a to 4d is so designed as to be opened at a predetermined time subsequent to the opening of the associated first exhaust valve 8a as shown in FIG. 6.

In the embodiment which will now be described with particular reference to FIGS. 9 to 11, although the first and second exhaust valves 8a and 8b open the associated first and second exhaust ports 6a and 6b simultaneously at a predetermined time after the start of the intake stroke, that is, after the opening of both of the first and second intake valves 7a and 7b, the complete closure of the first exhaust valve 8a can take place either simultaneously with or subsequent to the complete closure of the second exhaust valve 8b. In other words, the timing at which the first exhaust valve 8a is completely closed is either matched with or delayed relative to that at which the second exhaust valve 8b is completely closed so that the intake-exhaust overlap period A shown in FIG. 4, during which the first exhaust port 6a, associated with the first exhaust valve 8a, and one of the first and second intake ports 5a and 5b are simultaneously held open, is either equal to or longer than the intake-exhaust overlap period B, shown in FIG. 4, during which the second exhaust port 6b and one of the first and second intake ports 5a and 5b are simultaneously open.

Figure 9:
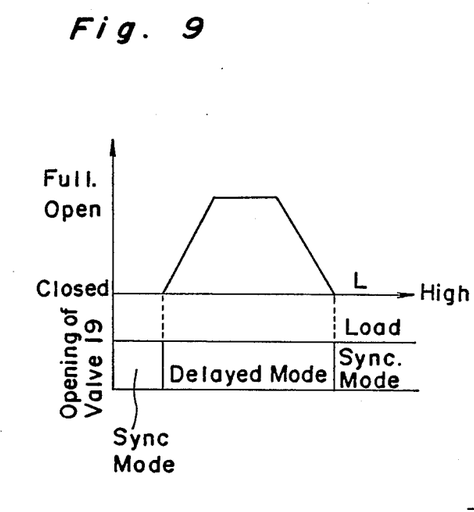
FIG. 9 is a graph showing an operating characteristic of the shutter valve according to a further embodiment of the present invention.
Figure 10:
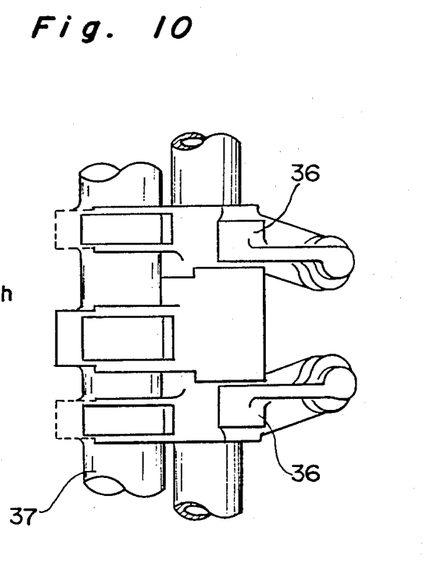
FIGS. 10 and 11 are schematic top and side views of a portion of a valve timing mechanism used in the engine according to a further embodiment of the present invention.
Figure 11:
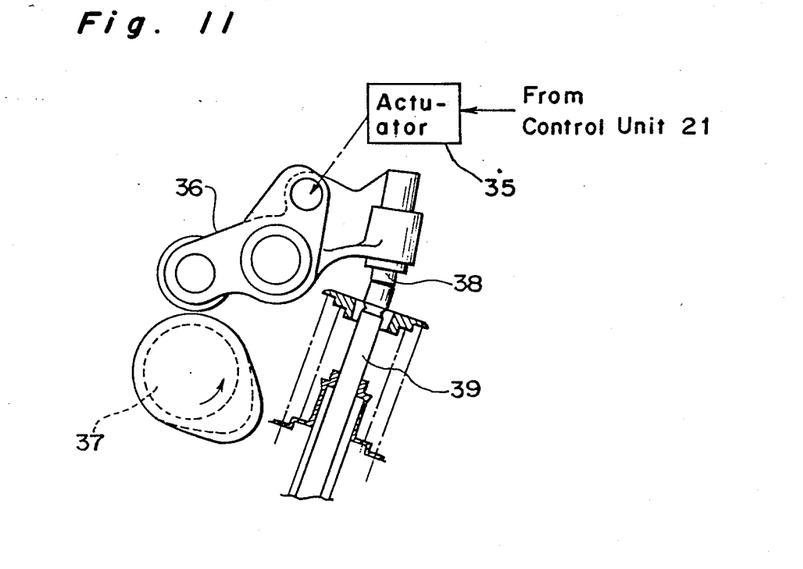

Specifically, according to the embodiment shown in FIGS. 9 to 11, the first exhaust valve 8a is designed to operate in a manner represented by a characteristic curve similar to the curve Y or a characteristic curve similar to the curve Z shown in FIG. 4, depending on the engine operating condition while the second exhaust valve 8b is designed to only operate in a manner represented by a curve similar to the curve Z.

To this end, a variable valve mechanism including an actuator 35 operable in response to a command generated from the control unit 21 for adjusting the amount of valve lift associated with the first exhaust valve 8a is employed. According to the variable valve mechanism, as best shown in FIGS. 10 to 11, a rocker arm 36 for each exhaust valve 8a or 8b has an externally threaded actuating rod 38 adjustably mounted to the rocker arm 36, said actuating rod 38 being used for driving the valve rod in synchronism with the rotation of a cam shaft 37. When the position of the actuating rod 38 relative to the rocker arm 36 is adjusted by the actuator 35, the stroke over which a valve rod integral with the respective exhaust valve 8a or 8b is reciprocated can be varied. The details of this variable valve mechanism are well known and are disclosed in, for example, U.S. Pat. No. 4,690,110, patented Sept. 1, 1987, which is herein incorporated by reference. It is, however, to be noted that the variable valve mechanism disclosed in the above-mentioned U.S. patent is directed to the timing control between the intake valves; however, the technique disclosed therein can be equally applicable to the timing control between the exhaust valves.

Briefly speaking, the variable valve mechanism disclosed in the above-mentioned U.S. patent is a mode changer incorporated in the timing valve mechanism and is operable at one of synchronized and delayed modes for controlling the timing of complete closure of one of the exhaust valves relative to the timing of complete closure of the other of the exhaust valves. Specifically, as applied to the present invention, when the mode changer is in the synchronized mode, the first and second exhaust valves 8a and 8b are opened and closed substantially simultaneously with the opening and closure of the first and second intake valves 7a and 7b, respectively. When the mode changer is in the delayed mode, however, while the first and second exhaust valve 8a is completely closed subsequent to the complete closure of the second exhaust valve 8b so that the intake-exhaust overlap period, during which the first exhaust port 6a and one of the intake ports 5a and 5b are simultaneously held open, is longer than the intake-exhaust overlap period during which the second exhaust port 6b and one of the first and second intake ports 5a and 5b are simultaneously held open, as shown in the graph of FIG. 4.

In the embodiment shown in and described with reference to FIGS. 9 to 11, as shown in FIG. 9, the variable valve mechanism is operated in the delayed mode during a medium load engine operating condition to delay the complete closure of the first exhaust valve 8a relative to the complete closure of the second exhaust valve 8b; however, the SVT mechanism is operated in the synchronized mode during operation of the engine at any one of the operating conditions other than the medium load operating condition.

The recirculation of internal exhaust gas is carried out only during the medium load engine operating condition, that is, during the period in which the variable valve mechanism is in the delayed mode, by the adjustment of the opening of the exhaust shutter valve 19. As hereinbefore discussed, the adjustment of the opening of the exhaust shutter valve 19 is carried out by the control unit 21 through the actuator 35 in dependence on the load on the engine E. Therefore, the adjustment of the opening of the exhaust shutter valve 19 results in the regulation of that portion of the exhaust gases allowed to remain within, or forced to back-flow into, the combustion chamber 4 to an amount appropriate for a particular engine operating condition.

It is to be noted that, in any one of the foregoing embodiments, when the exhaust shutter valve 19 is completely or substantially closed, the discharge of the exhaust gases from the combustion chamber to the outside through the exhaust system will not be hampered because of the second exhaust duct 18b which is open at all times.

It is also to be noted that, if one of the first and second intake ports 5a and 5b is so designed and so configured as to effect a strong swirling motion of the combustible mixture within the combustion chamber, it is recommended to design and configure the first exhaust port 6a to permit that portion of the exhaust gases back-flowing into the combustion chamber 4 through the second exhaust port 6a to join the swirling flow of the subsequently supplied combustible mixture thereby facilitating the draw of that portion of the exhaust gases back into the combustion chamber 4.

Similarly, if a fuel injector 10 is employed to inject fuel into the combustion chamber 4 through the intake ports 5a and 5b, it is recommended to design and configure the first exhaust port 6a to permit that portion of the exhaust gases back-flowing into the combustion chamber 4 therethrough to mix with the subsequently supplied combustible mixture thereby facilitating the atomization of the combustible mixture due to the temperature of that portion of the exhaust gases.

From the foregoing description, it has now become clear that the EGR system according to the present invention is effective to substantially accurately regulate the exhaust gases utilized in the combustion chamber in an admixture with the fresh combustible mixture to an amount appropriate for a particular engine operating condition, by properly controlling the opening of the exhaust shutter valve based on the engine operation condition. Therefore, the present invention is advantageous in that the EGR system as a whole is reliable and durable while accomplishing the accurate control of the amount of the exhaust gases allowed to substantially remain within or back-flow into the combustion chamber.

Although the present invention has been fully described in connection with the preferred embodiments thereof with reference to the accompanying drawings, it is to be noted that various changes and modifications are apparent to those skilled in the art. By way of example, in the embodiment shown in and described with reference to FIG. 5, instead of disposing the exhaust shutter valve 19 in the exhaust manifold duct 18a, an exhaust shutter valve 19 may be disposed in each of the exhaust branch passages 30a to 30d.

Such changes and modifications are to be understood as included within the scope of the present invention unless they depart therefrom.

We claim:

1. An exhaust gas recirculating system of a combustion engine having at least one cylinder including a combustion chamber communicating with a source of combustible air-fuel mixture through at least one intake port adapted to be selectively closed and opened for effecting the interruption and admission of the supply of the combustible mixture into the combustion chamber, the combustion chamber also communicating with an exhaust system through first and second exhaust ports both adapted to be selectively opened and closed, said exhaust gas recirculating system comprising:
   an intake valve operatively associated with the intake port for selectively opening and closing the intake port;
   first and second exhaust valves operatively associated with the first and the second exhaust ports, respectively, for selectively closing and opening the first and second exhaust ports in a manner generally opposite to the manner in which the intake valve opens and closes the intake port, said first exhaust valve being operable to completely close the first exhaust port subsequent to the complete closure of the second exhaust port by the second exhaust valve;
   an exhaust passage extending between the first exhaust port and the exhaust system;
   an exhaust shutter means operatively associated with the exhaust passage for selectively opening and closing the exhaust passage
   sensor means for sensing the load imposed on the engine and the speed at which the engine is operating; and
   control means for determining the operating condition of the engine based on the load and speed thereof,
   , and said control means operatively connected to said shutter means for controlling said shutter means to close the exhaust passage when the engine is operating at a relatively low speed under a relatively low load, and when the engine is operating at a relatively low speed under a relatively high load, and to partially open the exhaust passage a predetermined amount when the engine is operating at a relatively medium speed under a relatively medium load to regulate the amount of exhaust gases remaining in the cylinder when the engine is operating at a relatively medium speed under a relatively medium load.

2. A system as claimed in claim 1, wherein said control means also controls said shutter means to open the exhaust passage completely whenever the engine is operating at a relatively high speed.

3. A system as claimed in claim 1,
   and further comprising an adjustable variable valve mechanism operatively connected to the first exhaust valve for adjustably establishing the timing in which the first exhaust valve closes the first exhaust port relative to when the second exhaust port has been closed by said second exhaust valve,
   said variable valve mechanism adjustable to a synchronized mode in which the closing of the first exhaust port by said first exhaust valve is timed to coincide with the closing of the second exhaust port by said second exhaust valve and a delayed mode in which the closing of the first exhaust port by the first exhaust valve is timed to occur after the closing of the second exhaust port by the second exhaust valve.

4. A system as claimed in claim 3,
   wherein said variable valve mechanism includes a rocker arm pivotably mounted in the engine, an actuating rod supported by said rocker arm and engageable with said first exhaust valve for controlling the same to open and close the exhaust passage, and an actuator means for adjusting the relative position of said actuating rod and said first exhaust valve.

5. An exhaust gas recirculating system of a combustion engine having at least one cylinder including a combustion chamber communicating with a source of combustible air-fuel mixture through at least one intake port adapted to be selectively closed and opened for effecting the interruption and admission of the supply of the combustible mixture into the combustion chamber, the combustion chamber also communicating with an exhaust system through first and second exhaust ports both adapted to be selectively opened and closed, said exhaust gas recirculating system comprising:
   an intake valve operatively associated with the intake port for selectively opening and closing the intake port;
   first and second exhaust valves operatively associated with the first and the second exhaust ports, respectively, for selectively closing and opening the first and second exhaust ports in a manner generally opposite to the manner in which the intake valve opens and closes the intake port, said first exhaust valve being operable to completely close the 6. A system as claimed in claim 5, wherein said control means also controls said shutter means to open the exhaust passage completely whenever the engine is operating at a relatively high speed.

7. A system as claimed in claim 5,
   and further comprising an adjustable variable valve mechanism operatively connected to the first exhaust valve for adjustably establishing the timing in which the first exhaust valve closes the first exhaust port relative to when the second exhaust port has been closed by said second exhaust valve, said variable valve mechanism adjustable to synchronized mode in which the closing of the first exhaust port by said first exhaust valve is timed to coincide with the closing of the second exhaust port by said second exhaust valve and a delayed mode in which the closing of the first exhaust port by the first exhaust valve is timed to occur after the closing of the second exhaust port by the second exhaust valve.

8. A system as claimed in claim 7, wherein said variable valve mechanism includes a rocker arm pivotably mounted in the engine, an actuating rod supported by said rocker arm and engageable with said first exhaust valve for controlling the same to open and close the exhaust passage, and an actuator means for adjusting the relative position of said actuating rod and said first exhaust valve. first exhaust port subsequent to the complete closure of the second exhaust port by the second exhaust valve;

adjusting means operatively connected to one of the exhaust valves for selectively adjusting the timing at which the complete closure of the first exhaust port by the first exhaust valve takes place subsequent to the complete closure of the second exhaust port by the second exhaust valve;

an exhaust passage extending between the first exhaust port and the exhaust system;

an exhaust shutter means operatively associated with the exhaust passage for selectively opening and closing the exhaust passage sensor means for sensing the load imposed on the engine and the speed at which the engine is operating; and control means for determining the operating condition of the engine based on the load and speed thereof, , and said control means operatively connected to said shutter means for controlling said shutter means to close the exhaust passage when the engine is operating at a relatively low speed under a relatively low road, and when the engine is operating at a relatively low speed under a relatively high load, and to partially open the exhaust passage a predetermined amount when the engine is operating at a relatively medium speed under a relatively medium load to regulate the amount of exhaust gases remaining in the cylinder when the engine is operating at a relatively medium speed under a relatively medium load.

9. An exhaust gas recirculating system of a multicylinder combustion engine having a plurality of cylinders, each of said cylinders including a combustion chamber communicating with a common source of combustible air-fuel mixture through at least one respective intake port adapted to be selectively closed and opened for effecting the interruption and admission of the supply of the combustible mixture into the combustion chamber, respectively, each said combustion chamber communicating with an exhaust system through respective first and second exhaust ports both adapted to be selectively opened and closed, said exhaust gas recirculating system comprising:

an intake valve operatively associated with each said intake port for selectively opening and closing said intake port;

first and second exhaust valves operatively associated with each of the first and the second exhaust valves for selectively closing and opening each of the first and second exhaust ports in a manner generally opposite to the manner in which the intake valve opens and closes the intake port, said first exhaust valve being operable to completely close the first exhaust port subsequent to the complete closure of the second exhaust port by the second exhaust valve;

said exhaust system including first and second exhaust passage means, the first exhaust passage means including first exhaust manifold passages fluid-connected respectively with the first exhaust ports, said second exhaust passage means including second exhaust manifold passages fluid-connected respectively with the second exhaust ports;

an exhaust shutter means operatively disposed in the first exhaust passage means for selectively opening and closing the first exhaust passage means to adjust the cross-sectional area thereof; and a control means operatively connected to said exhaust shutter means for controlling the shutter means according to an engine operating condition to adjust the amount of a portion of the exhaust gases allowed to substantially remain within any one of the cylinders.

10. The system as claimed in claim 9, wherein said first exhaust passage means also includes a first exhaust duct to which respective ends of the first exhaust manifold passages remote from the associated first exhaust ports are fluid-connected, and wherein said exhaust shutter means is operatively disposed in said first exhaust duct.

11. The system as claimed in claim 9, wherein each said first exhaust port communicating with a respective one of the cylinders is adapted to be opened earlier by a said first exhaust valve than the opening of the associated second exhaust port communicating with said respective one of said cylinders by a said second exhaust valve.

* * * * *